United States Patent [19]

Rasmussen

[11] Patent Number: 5,251,399
[45] Date of Patent: Oct. 12, 1993

[54] VERTICAL PLANT STAND

[76] Inventor: Von O. Rasmussen, 4408 Mark Ave., Las Vegas, Nev. 89108

[21] Appl. No.: 965,740

[22] Filed: Oct. 23, 1992

[51] Int. Cl.⁵ .................... A01G 31/00; A01G 9/24
[52] U.S. Cl. .................................... 47/39; 47/82; 47/83; 47/62; 211/86
[58] Field of Search ............... 47/39, 81, 83, 39 C, 47/62, 82; 211/68, 86, 127; 248/236

[56] References Cited

U.S. PATENT DOCUMENTS

| | | | |
|---|---|---|---|
| 3,451,162 | 6/1969 | Rasmussen | 47/62 |
| 4,006,559 | 2/1977 | Carlyon, Jr. | 47/82 |
| 4,033,072 | 7/1977 | Kobayashi et al. | 47/83 |
| 4,561,208 | 12/1985 | Schultz | 47/39 C |
| 4,896,456 | 1/1990 | Grant | 47/83 |
| 4,951,416 | 8/1990 | Gutridge | 47/62 |
| 4,999,947 | 3/1991 | Whitaker | 47/81 |

FOREIGN PATENT DOCUMENTS

| | | | |
|---|---|---|---|
| 2390897 | 1/1979 | France | 47/82 |
| 2107962 | 5/1983 | United Kingdom | 47/81 |

*Primary Examiner*—Carl D. Friedman
*Assistant Examiner*—Christopher T. Kent
*Attorney, Agent, or Firm*—John Edward Roethel

[57] ABSTRACT

A vertical plant stand arrangement includes a lower base having a water reservoir and pumping system, the electrical controls and timer unit; a central vertical support column provided with a plurality of plant stations and, optionally, an upper cover that house the water drip distribution system and the lighting system. The base has two physically separate sections—one housing the water reservoir and pumping system and the other housing the electrical system and timer. The water reservoir includes a filtering system and feeding lines to the top of the central vertical support column as well as return lines from each plant station to the water reservoir. The electrical system includes a timer that activates the pumping system in the water reservoir. The central vertical support column includes a hollow interior passageway for receiving the water lines and a plurality of plant stations attached thereto. The location of each of the plant stations is adjustable to allow different plant configurations. Each plant station can include a wicking arrangement to augment the drip system contained in the cover at the top of the central support column. The central support column also includes at its top a cover arrangement that includes the lighting system and a water distribution system to provide water to each of the plant stations on a drip system format.

15 Claims, 13 Drawing Sheets

VERTICAL PLANT STAND

This invention relates to a vertical plant stand, and more particularly to a vertical plant stand that includes a lower base having a water reservoir and pumping system, the electrical controls and a timer unit; a central vertical support column provided with a plurality of plant stations and, optionally, an upper cover that houses the water drip distribution system and the lighting system.

BACKGROUND OF THE INVENTION

There have been many devices developed over the years as plant stands for the indoor growing and display of house plants. Some of these devices are purely decorative in that they are simply display stands and configurations that provide support for one or more plants. Their primary design criteria is ornamental to match the style and decor of the home or office in which they are placed.

Other indoor plant stands attempt to combine ornamentality with functionality. For example, plant stands have been configured with grow lights to improve the health and lifespan of indoor plants. Other apparatus have been developed that include irrigation systems, including timers, to maintain the plants watered on a regular basis.

None of the devices have been specifically designed and configured to combine ornamental qualities for indoor display in a desirable self-contained apparatus with the necessary functional elements to maintain the plants properly watered so as to improve their health and well-being in a controlled indoor environment.

It is an object of the present invention to provide a vertical plant stand arrangement that includes both watering and lighting control, while at the same time presenting the plants in an attractive and stylishly compatible display.

It is a feature of the present invention to provide a vertical plant stand arrangement that includes a lower base having a water reservoir and pumping system, the electrical controls and a timer unit; a central vertical support column provided with a plurality of plant stations and, optionally, an upper cover that houses the water drip distribution system and the lighting system.

It is an advantage of the present invention that the plants mounted for display on the vertical plant stand will be maintained by an automatic electrical watering system which is completely hidden from the observer's view. The watering system is preferably a drip-type system that maximizes water conservation while, at the same time, preventing overwatering of the plants. Even though the control unit and watering system are hidden from view during normal display of the plants, all functional parts of the vertical plant stand arrangement are readily accessible for maintenance or repair. The vertical plant stand arrangement includes a vertical support column that allows various orientations and configurations of the plants displayed thereon, thus not limiting the user to a predetermined arrangement.

Other objects, features and advantages of the present invention will become apparent from a consideration of the following detailed description.

SUMMARY OF THE INVENTION

A vertical plant stand arrangement includes a lower base having a water reservoir and pumping system, the electrical controls and timer unit; a central vertical support column provided with a plurality of plant stations and, optionally, an upper cover that house the water drip distribution system and the lighting system. The base has two physically separate sections—one housing the water reservoir and pumping system and the other housing the electrical system and timer. The water reservoir includes a filtering system and feeding lines to the top of the central vertical support column as well as return lines from each plant station to the water reservoir. The electrical system includes a timer that activates the pumping system in the water reservoir.

The central vertical support column includes a hollow interior passageway for receiving the water lines and a plurality of plant stations attached thereto. The location of each of the plant stations is adjustable to allow different plant configurations. Each plant station can include a wicking arrangement to augment the drip system contained in the cover at the top of the central support column.

The central support column also includes at its top a cover arrangement that includes the lighting system and a water distribution system to provide water to each of the plant stations on a drip system format.

DETAILED DESCRIPTION OF THE PREFERRED EMBODIMENTS

Figure 1:
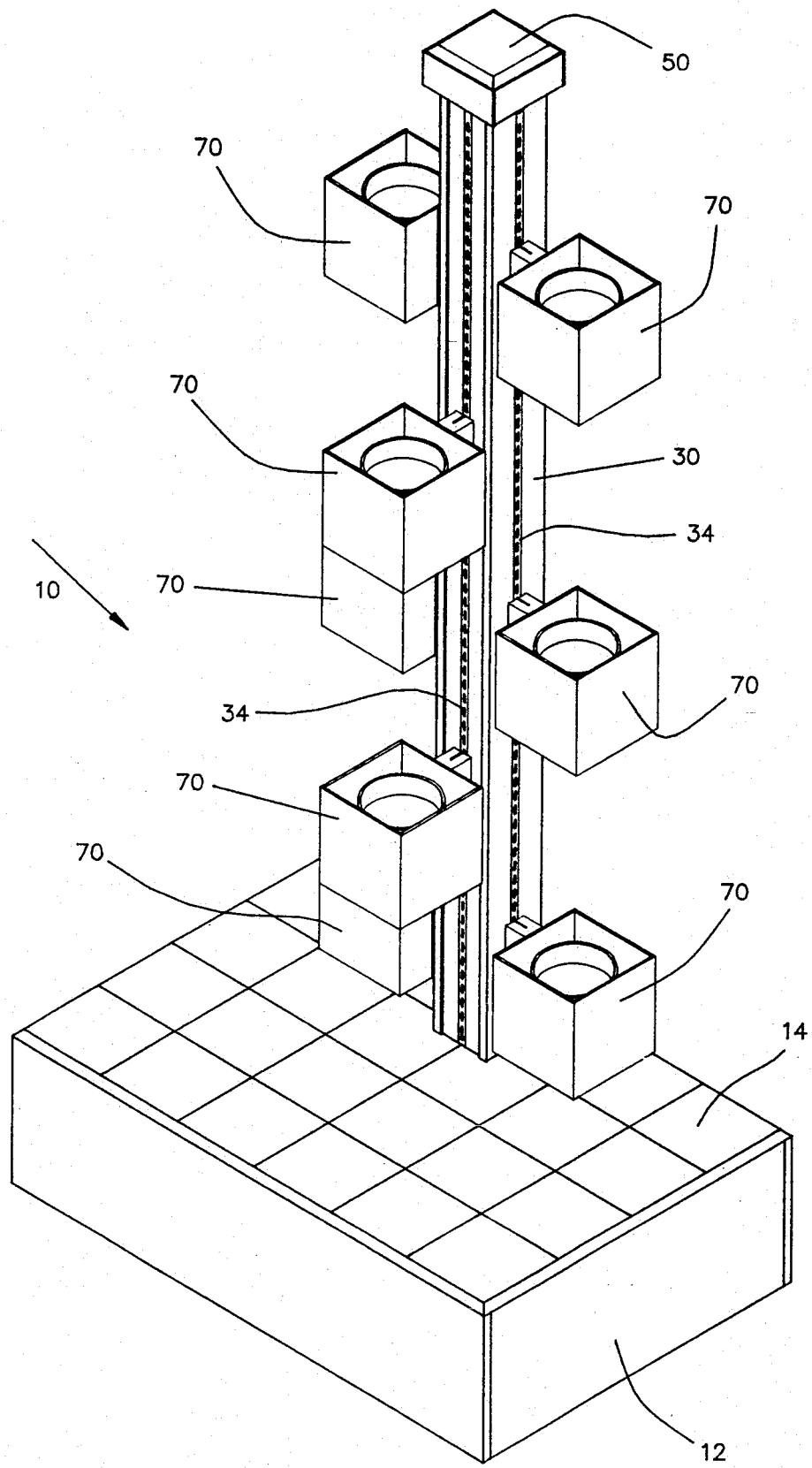
FIG. 1 shows a perspective view of one embodiment of the vertical plant stand assembly of the present invention.

The vertical plant stand assembly of the present invention is shown generally at 10 in FIG. 1. The vertical plant stand assembly 10 comprises a generally rectangular lower base section 12, although other shapes for the lower base section 12 could be used as desired for aesthetic purposes. The lower base section 12 has a removable base cover 14 that protects the interior of the lower base section 12 and provides an ornamental appearance to the lower base section 12. The base cover 14 can be made from decorative tiles or any other material desired to effect a pleasing appearance.

Upstanding toward the rear of the lower base section 12 is a central vertical support column 30 which can be a generally rectangular member, although other cross-sections can be used. On one or more of the sides of the central vertical support column 30 there are provided a vertical mounting track 34 to which are attached one or more plant stations 70. Any suitable mounting arrangement can be used to attach the plant stations 70 to the central vertical support column 30 as desired for either aesthetic or functional purposes.

The top of the central vertical support column 30 is provided with a upper cover section 50 that houses a water distribution system used to provide water through a drip system arrangement to each of the plant station 70.

Figure 2:
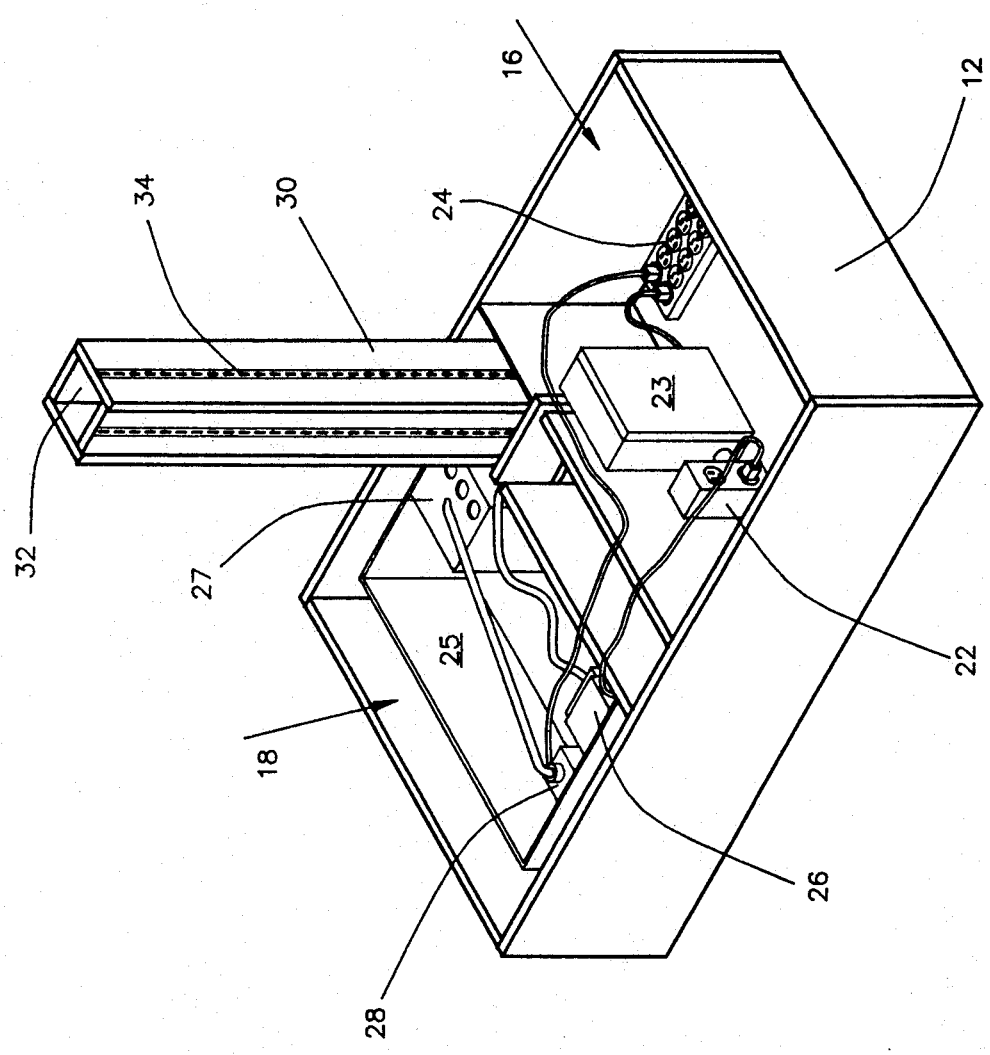
FIG. 2 shows a perspective view of the base section with the base cover removed of one embodiment of the vertical plant stand assembly of the present invention.

As shown in FIG. 2, the lower base section 12 is divided into two separate compartments—the electrical compartment 16 and the water reservoir compartment 18. It is desirable to physically separate the electrical compartment 16 from the water reservoir compartment 18 to avoid any possible damage from leaking or splashing water in the water reservoir compartment 18 to the electrical components housed in the electrical compartment 16.

The water reservoir compartment 18 includes a water reservoir 25 that functions as the water supply for each of the plants positioned in the plant stations 70 mounted around the central vertical support column 30. The water reservoir compartment 18 is provided with a watering pump 26, a filter 27 and a circulating pump 28. The circulating pump 28 and the filter 27 function to circulate and filter the water in the water reservoir compartment 18 to eliminate contaminants while the watering pump 26 is used to send water up the central vertical support column 30 to the upper cover section 50 as will be explained. The circulating pump 28 and the filter 27 are connected by electrical lines to the main board 24 on the electrical compartment 16 and are designed to operate constantly to circulate and filter the water in the water reservoir 25. The watering pump 26 is plugged into an outlet 22 on the timer 23 and is activated at whatever times the timer 23 is set by the user to pump water to the water distribution system 53 in the upper cover section 50.

The electrical compartment 16 includes a main board 24 to supply power to the circulating pump 28 located in the water reservoir compartment 18 as well as the timer 23 located in the electrical compartment 16. The main board in turn is connected to a source of electrical power (not shown) such as a normal outlet in the wall of the room in which the vertical plant stand assembly 10 is located.

Figure 3:
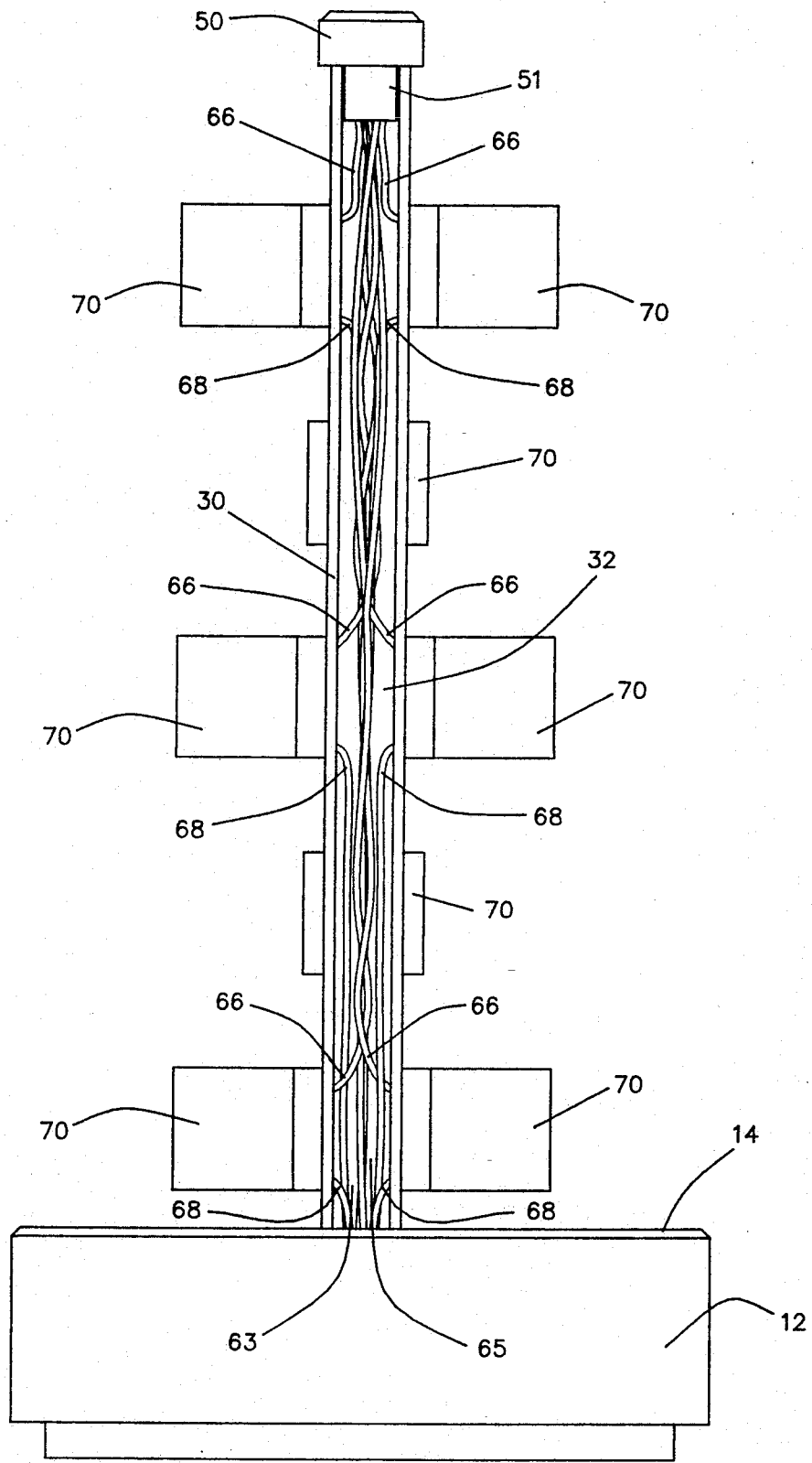
FIG. 3 shows a rear view of the vertical plant stand assembly of the present invention showing the interior of the vertical support column.

FIG. 3 shows a rear view of the vertical plant stand assembly 10 of the present invention revealing the hollow interior 32 of the central vertical support column 30. Inside the hollow interior 32 of the central vertical support column 30 there are provided a plurality of water feed lines 66 and water return lines 68. Each water feed line 66 descends from a water distribution system in the interior of the upper cover section 50 to its respective plant station 70 to provide water to the plant located at that particular plant station 70. Each plant station 70 is also provided with a water return line 68 that descends to the bottom of the central vertical support column 30 and from there into the water reservoir compartment 18 to recycle any overflow water back to the water reservoir compartment 18.

Inside the hollow interior 32 of the central vertical support column 30, there is also provided a main water line 65 from the water reservoir compartment 18 up the center to the central vertical support column 30 to the upper cover section 50 at the top of the central vertical support column 30. This allows water from the water reservoir 25 in water reservoir compartment 18 to be pumped by the watering pump 26 to the water distribution system inside the upper cover section 50. A main water return line 63 is also provided to return excess water directly from the upper cover section 50 to the water reservoir 25.

Figure 4:
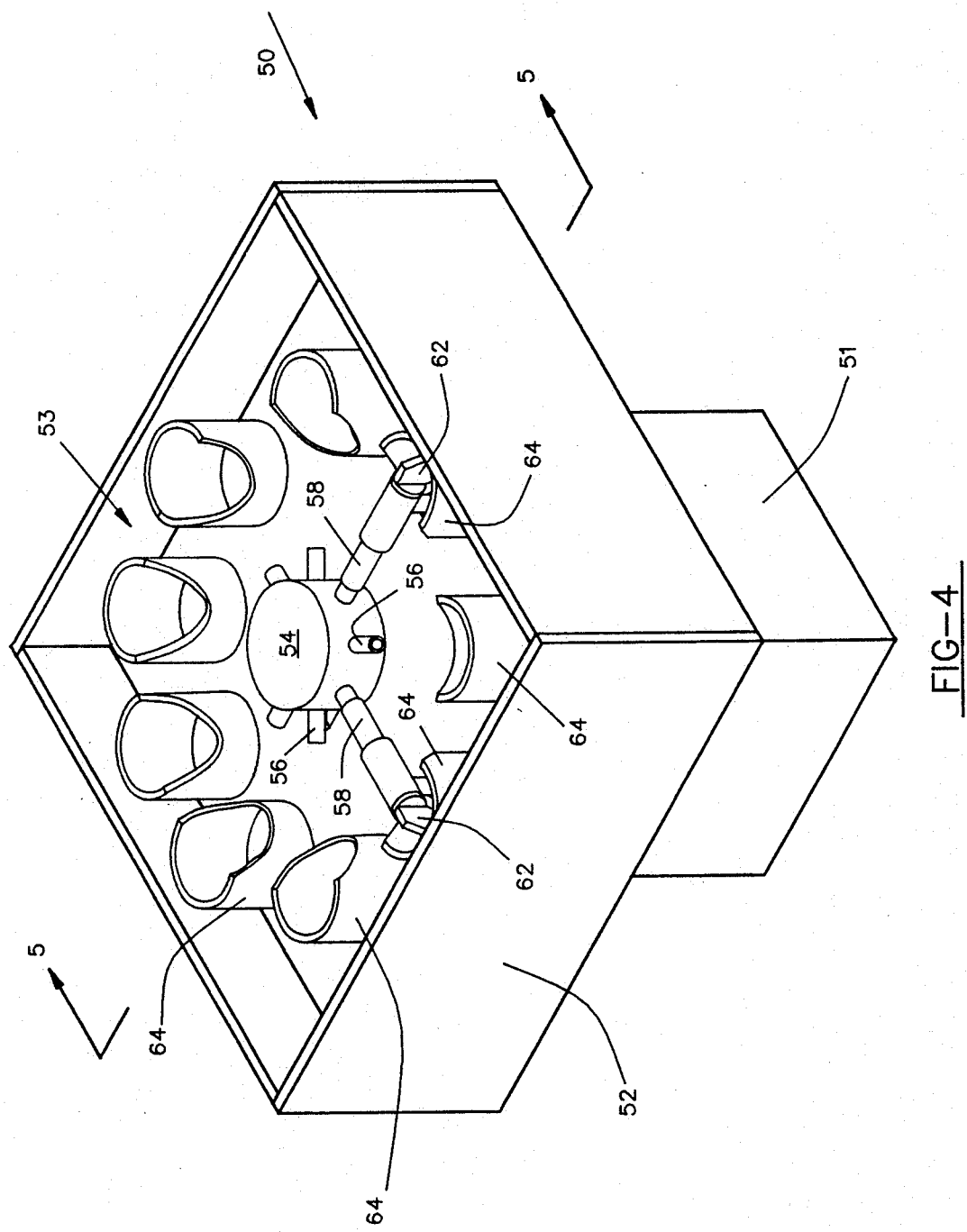
FIG. 4 shows a perspective view of the upper cover section with the top removed showing the water distribution system of one embodiment of the vertical plant stand assembly of the present invention.
Figure 5:
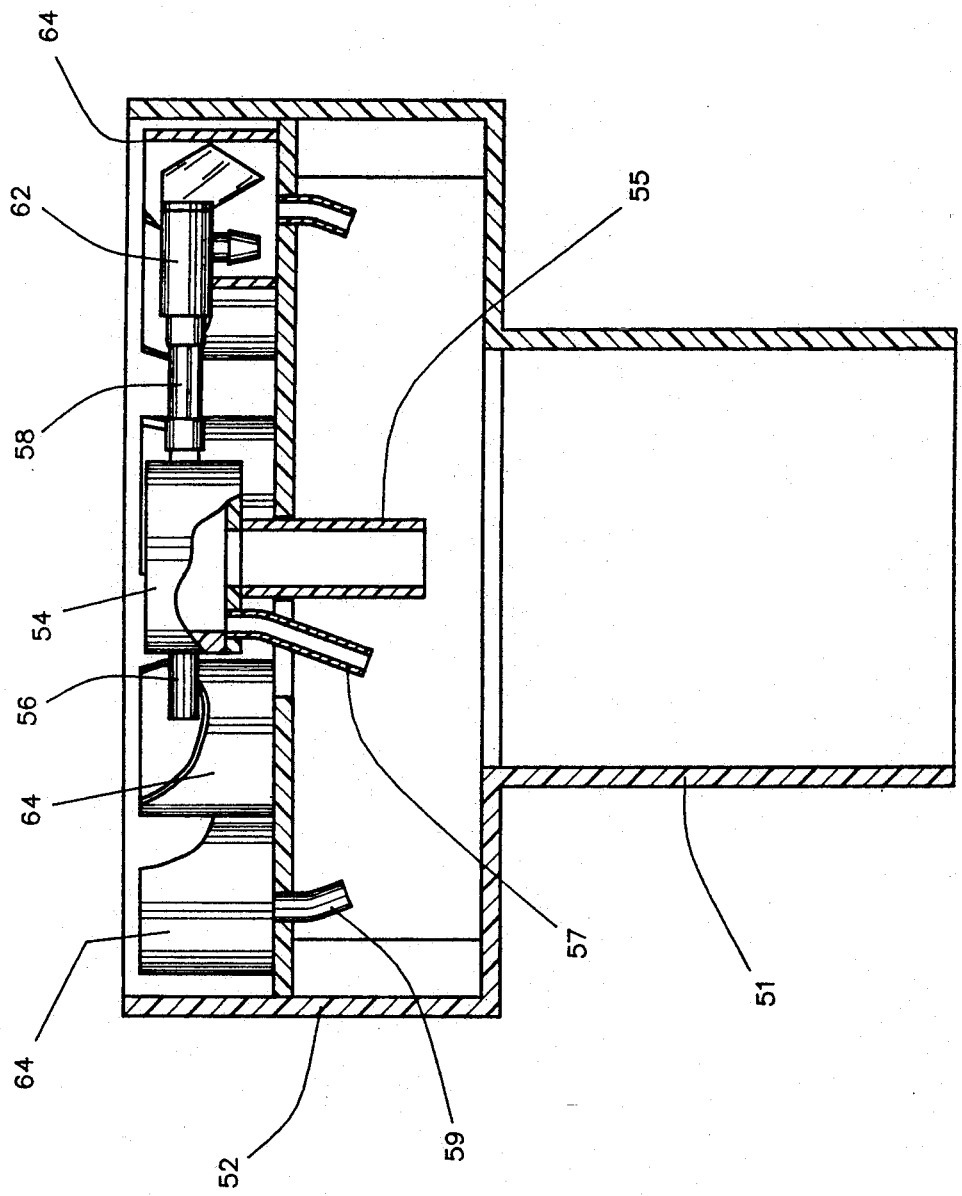
FIG. 5 shows a side view of FIG. 4 of the upper cover section with the top removed.
Figure 6:
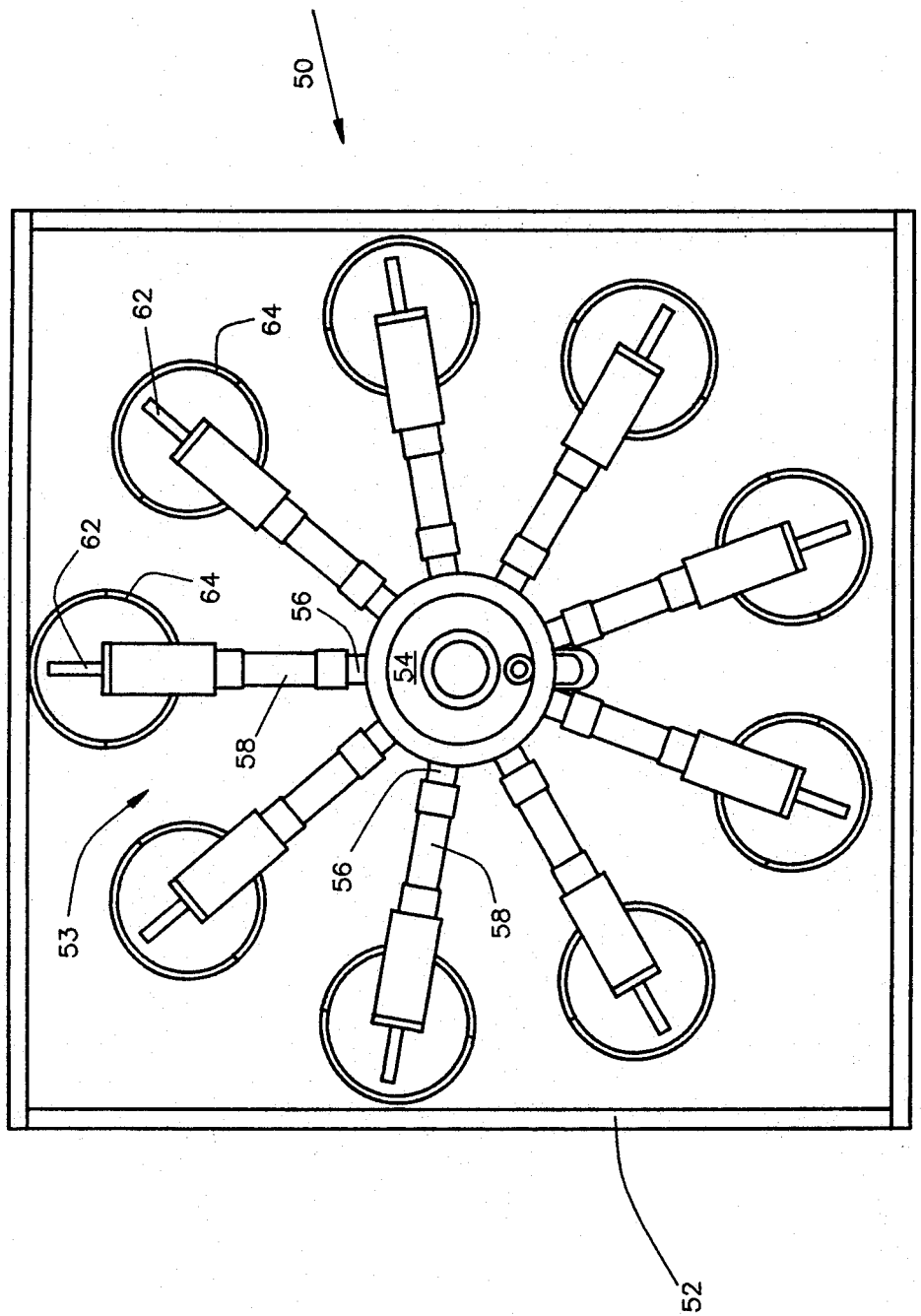
FIG. 6 shows a top view of FIG. 4 of the upper cover section with the top removed.

FIGS. 4, 5 and 6 show the upper cover section 50 which is mounted at the top of the central vertical support column 30 by means of a center mount 51 that slidably is received into the hollow interior 32 of the central vertical support column 30. The center mount 51 is generally rectangular with a hollow interior to accommodate the water lines on the interior of the central vertical support column 30. The upper frame 52 of the upper cover section 50 is also generally rectangular, although other shapes can be used for decorative purposes. The inside of the upper frame 52 is open and has mounted therein the water distribution system 53. The water distribution system 53 is preferably a drip type watering system so that water is conserved and the overwatering of the plants is avoided.

The water distribution system 53 comprises a distribution housing 54 located generally at the center of the upper frame 52 and connected by pipe 55 to the top of the main water line 65. The distribution housing also has an overflow pipe 57 attached thereto. The distribution housing 54 further includes a plurality of stems 56 extending therefrom. Each stem 56 has attached thereto a tubing 58 which ends in a nozzle 62. Each nozzle 62 is positioned adjacent a plant station feed chamber 64. Each plant station feed chamber 64 communicates with a plant station 70 by way of its own water feed line 66 connected to an outlet pipe 59.

During the operation of the water distribution system 53 and upon activation of the watering pump 26 by the timer 23, water is pumped from the water reservoir 25 up the central vertical support column 30 and into the distribution housing 54. The water is distributed through each of the nozzles 62 to a plant station feed chamber 64 where it is collected. Water drips out of each plant station feed chamber 64 down a water feed line 66 and into each individual plant pot 90.

Figure 7:
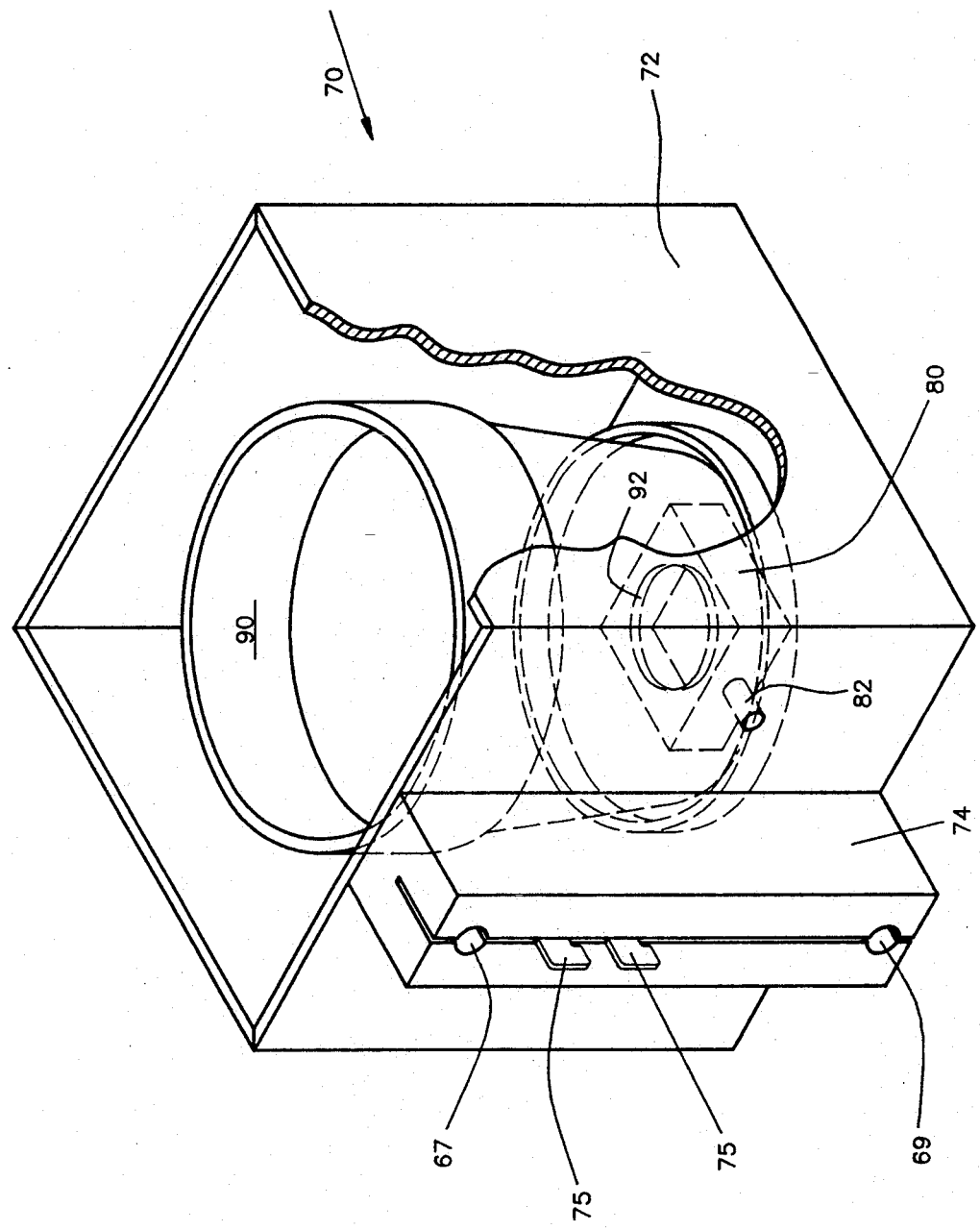
FIG. 7 shows a perspective view, partially in cutaway, showing one embodiment of a plant station used in the present invention.

A typical plant station 70 is shown in FIG. 7. The plant station 70 comprises a rectangular box 72 of adequate size and depth to hold a plant pot 90. The rectangular box 72 is provided with a mounting arm 74 with one or more mounting brackets 75 attached thereto that interengage with the mounting track 34 on the central vertical support column 30. A water feed line inlet 67 is provided in the mounting arm 74 to receive, from the water distribution system 53, the water feed line 66 which passes through the water feed line inlet 67 and can be disposed into the top of the plant pot 90 for access to a plant contained therein.

The plant pot 90 sits on a hollow base plate 80 provided at the bottom of the rectangular box 72. The hollow base plate 80 is generally hollow to allow water draining from the plant and passing through the bottom aperture 92 in the bottom of the plant pot 90 to be collected. The hollow base plate 80 also has a stem 82 from which the water in the hollow base plate 80 can be removed. The water return line 68 attaches to the stem 82 and passes through the water return line outlet 69 in the mounting arm 74 and down the hollow interior 32 of the central vertical support column 30 to the water reservoir 25.

Figure 8:
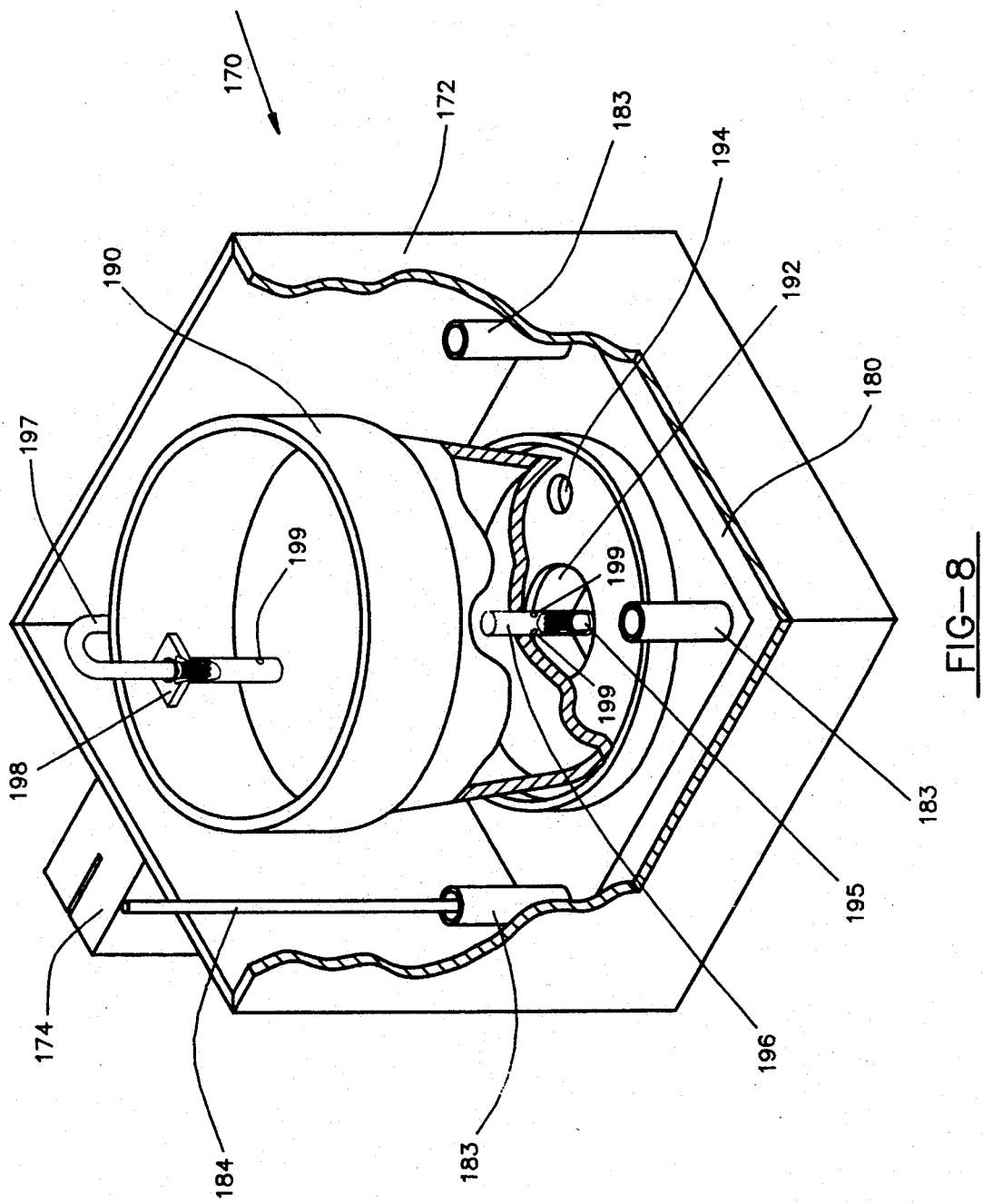
FIG. 8 shows a perspective view, partially in cutaway, showing another embodiment of a plant station used in the present invention.

An alternative plant station is shown generally at 170 in FIG. 8. The plant station 170 comprises a rectangular box 172 that is attached to the central vertical support column 30 of the vertical plant stand assembly 10 by the mounting arm 174 in the same manner as that shown in FIG. 7. The plant pot 190 is designed to operate with an additional wicking system that allows water stored in the interior of the hollow base plate 180 to be wicked into the plant contained in the plant pot 190.

As shown in FIG. 8, the hollow base plate 180 is provided with a plurality of access tubes 183 communicating with the interior of the hollow base plate 180. One of the access tubes 183 can be used as a fill hole to add water to the hollow base plate 180. Another of the access tubes 183 can be provided with a water level indicator 184 to provide a visual indicator of the water level in the hollow base plate 180.

A lower wick 195 can be positioned in a drain hole 192 in the bottom of the plant pot 190. The lower wick 195 can also be provided with a wick insert 196 having one or more water holes 199. The wick insert 196 can be a hollow plastic piece that allows easy placement of the wick insert into the soil at the bottom of the plant pot 190. The water holes 199 in the wick insert 196 provide access for the water to be drawn from the lower wick 195 into the soil to wick water into the bottom of the plant.

Another upper wick 197 can be disposed from an access tube 183 up into the top of the plant pot 190 to provide wicking directly to the upper regions of the plant. The upper wick 197 is also provided with a wick insert 198 with one or more water holes 199 to allow easy placement of the upper wick into the soil at the top of the plant pot 190. The bottom of the plant pot 190 may also be provided with additional drain holes 194, as desired or needed.

Alternative wicking systems can be used and other conventional plant arrangements can be positioned in either plant station 70 or plant station 170 when used in conjunction with the vertical plant stand assembly 10 of the present invention.

Figure 9:
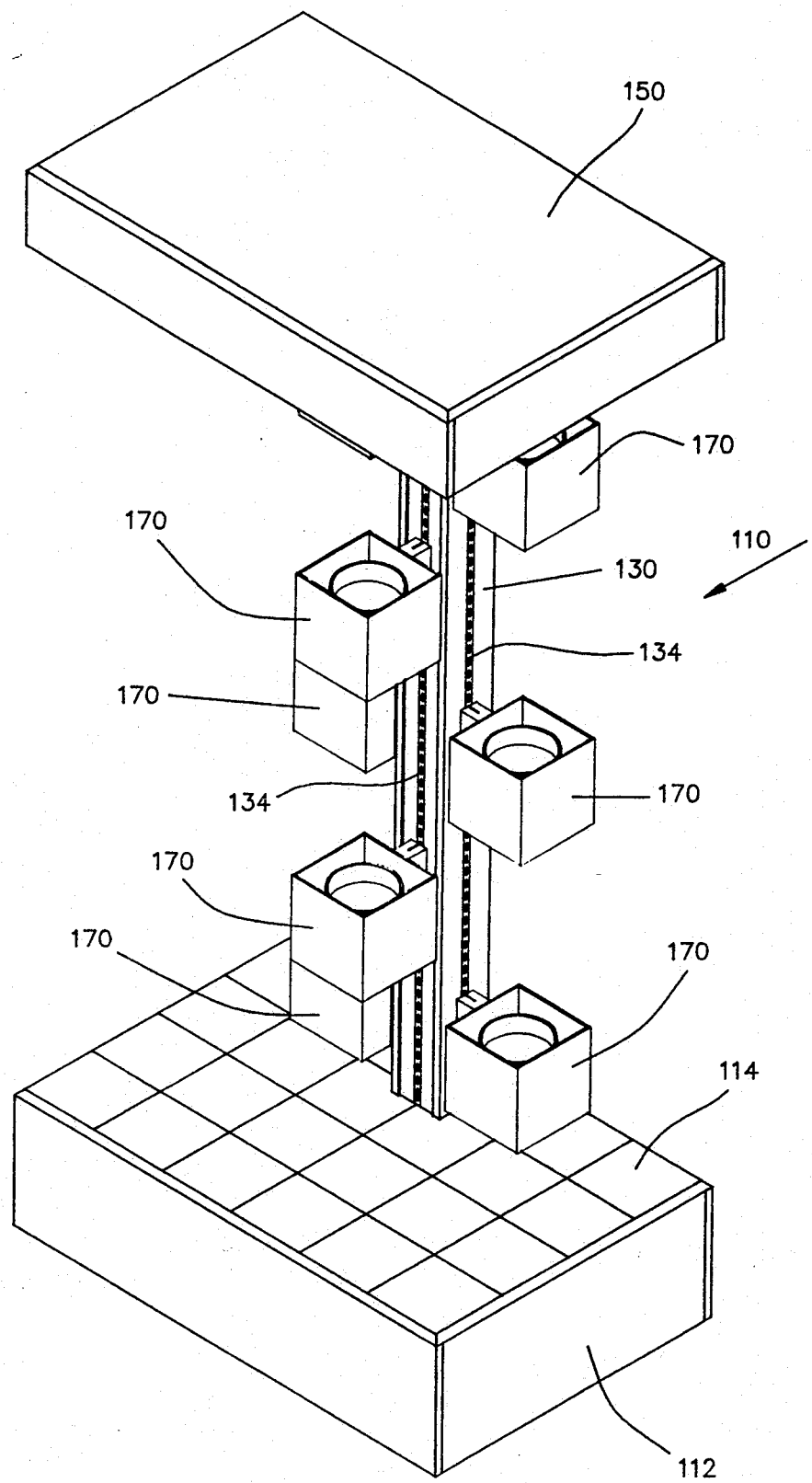
FIG. 9 shows a perspective view of another embodiment of the vertical plant stand assembly of the present invention.

FIG. 9 shows another embodiment of the vertical plant stand assembly of the present invention. This embodiment is quite similar to the version of the invention shown in FIG. 1 and comprises a generally rectangular lower base section 112, although other shapes for the lower base section 112 could be used as desired for aesthetic purposes. The lower base section 112 has a removable base cover 114 that protects the interior of the lower base section 112 and provides an ornamental appearance to the lower base section 112. The base cover 114 can be made from decorative tiles or any other material desired to effect a pleasing appearance.

Upstanding toward the rear of the lower base section 112 is a central vertical support column 130 which can be a generally rectangular member, although other cross-sections can be used. On one or more of the sides of the central vertical support column 130 there are provided a vertical mounting track 134 to which are attached one or more plant station 170. Any suitable mounting arrangement can be used to attach the plant station 170 to the central vertical support column 130 as desired for either aesthetic or functional purposes.

The top of the central vertical support column 130 is provided with an upper cover section 150 that houses a water distribution system used to provide water through a drip system arrangement to each of the plant stations 170.

The lower base section 112 is also divided into two separate compartments—the electrical compartment and the water reservoir compartment in the same manner as shown in FIG. 2 and this portion of the assembly operates the same way as the assembly shown in FIG. 2. The rear of the vertical plant stand assembly 110 is configured the same way as the rear of the vertical plant stand assembly 10 shown in FIG. 3 and functions in the same manner.

Figure 10:
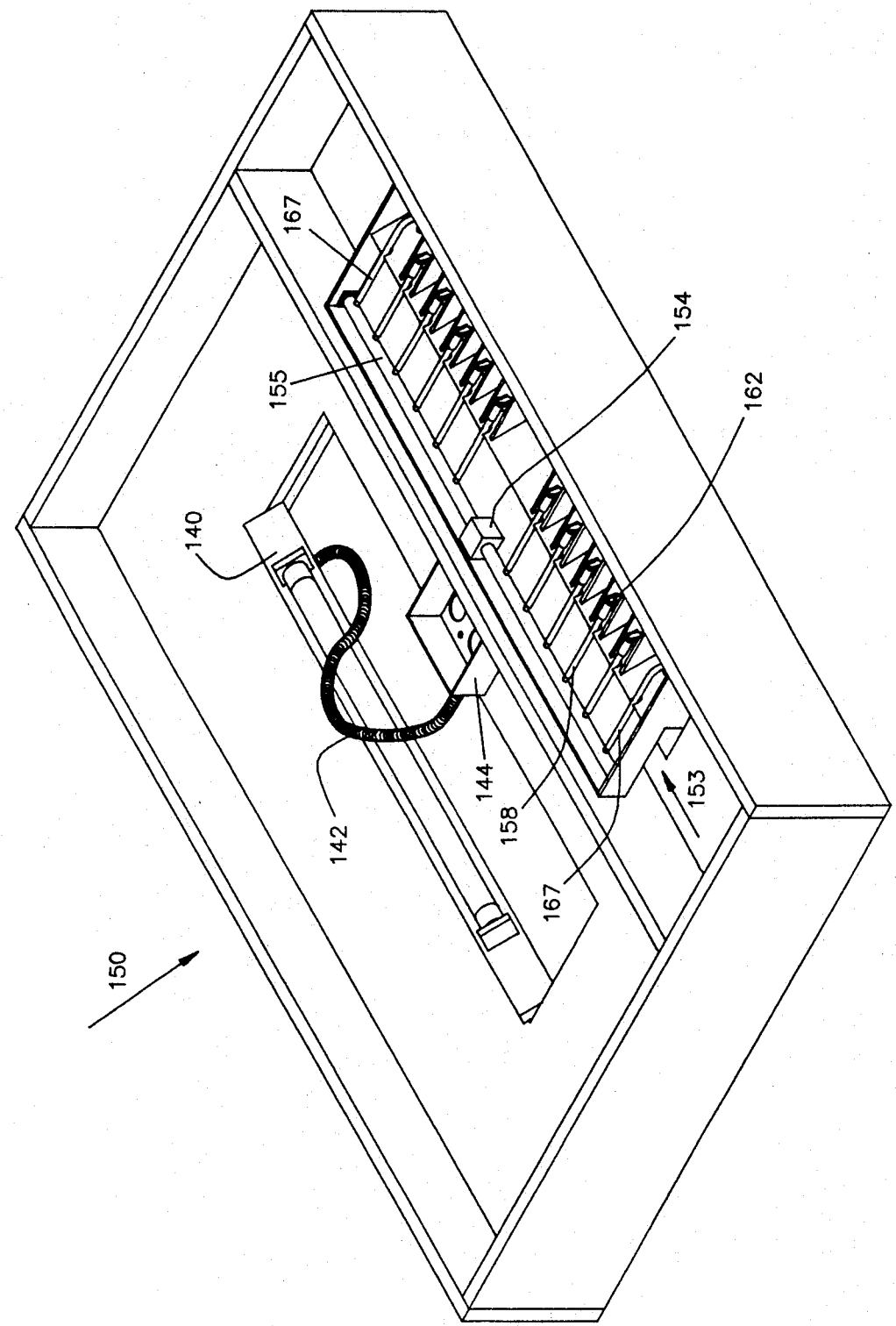
FIG. 10 shows a perspective view of another upper cover section with the top removed showing an alternative water distribution system of the present invention.

The main difference between the two embodiments is the upper cover section 150 and the water distribution system 153 located in the upper cover section 150. As shown in FIG. 10, the upper cover section 150 includes a light fixture 140 connected to an outlet 144 by an electrical conduit 142. A central portion of the bottom of the upper cover section 150 is open to allow light from the light fixture 140 to shine onto the plants mounted in the plant station 170 on the central vertical support column 130.

Figure 11:
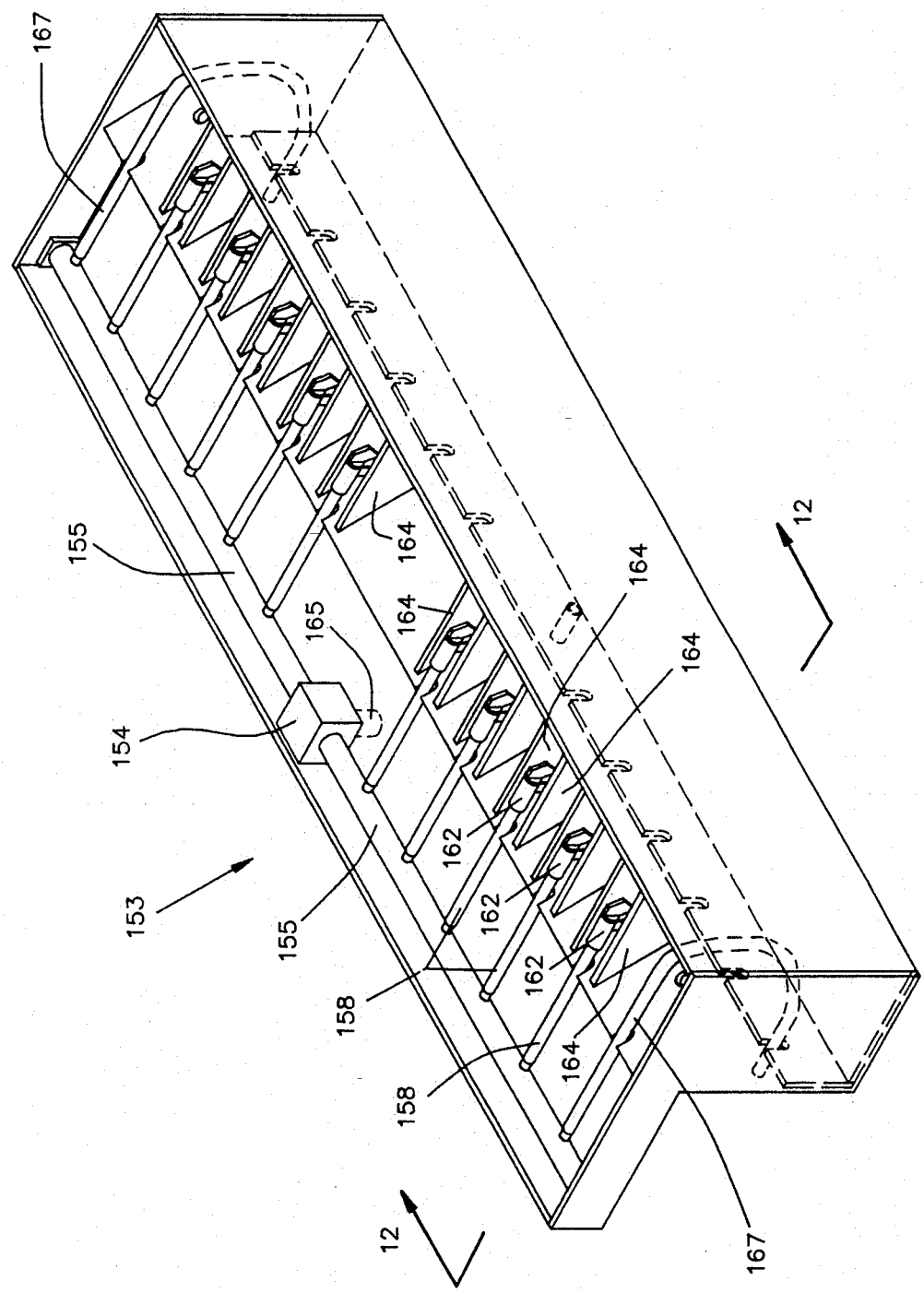
FIG. 11 shows a perspective view of the water distribution system shown in FIG. 10.
Figure 12:
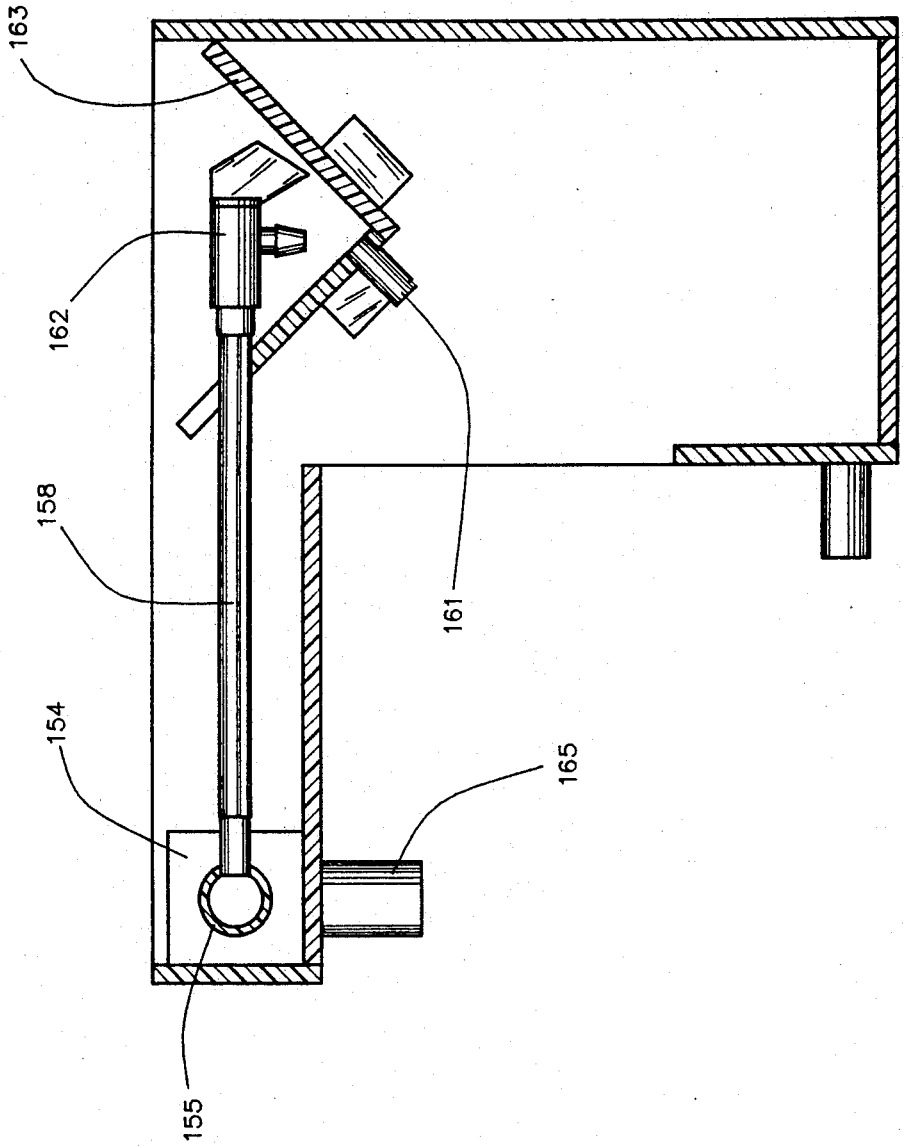
FIG. 12 shows a sectional view along line 12—12 of FIG. 11 of the water distribution system.

As shown in FIGS. 10, 11 and 12, the upper cover section 150 is also provided with a water distribution system 153 for feeding water to the various plant station 170 attached to the central vertical support column 130. The water distribution system 153 comprises a distribution housing 154 connected to the water feed line 166 from the water reservoir 25. In this embodiment, two main distribution lines 155 are connected to the distribution housing 154 and each distribution line 155 has a plurality of individual distribution lines 158 attached at various points along the length thereof. Each individual distribution line 158 ends in a nozzle 162. Each nozzle is positioned above a trough 163 which is separated into individual sections by the dividers 164. Along the bottom of the trough 163 and associated with each individual nozzle 162 is a pipe 161 to which is attached a water feed line to transport water from the trough 163 to an individual plant station.

At the end of each main distribution line 155 there is provided a water return line 167 to relieve any excess water pressure in the main distribution line 155. The water return line 167 is connected to a main water return line to return this excess water back to the water reservoir 25 in the water reservoir compartment 18.

During the operation of the water distribution system 153, water is pumped from the water reservoir 25 up the central vertical support column 30 and into the distribution housing 154. The water is distributed through each of the nozzles 162 into the trough 163 where it is collected. Water drips out of each trough 163 down a water feed line and into each individual plant pot 90 or 190. The dividers 164 operate to allocate an equal amount of water to each plant pot 90 or 190.

Figure 13:
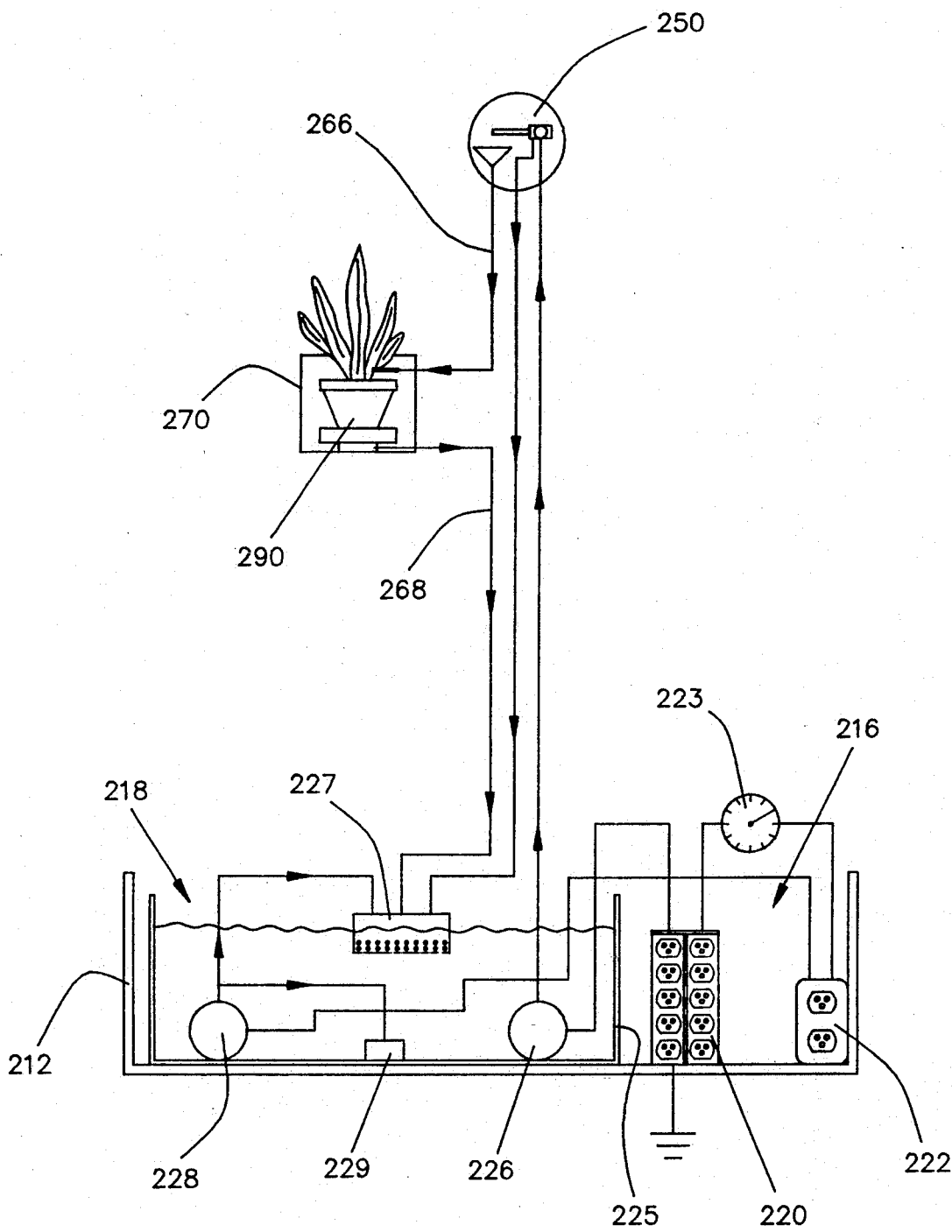
FIG. 13 shows a schematic representation of the vertical plant stand operating system of the present invention.

The operation of the vertical plant stand assembly 10 of the present invention is depicted schematically in FIG. 13. A water reservoir 225 is provided with water and a circulating pump 228 and water circulating disk 229 are operated to circulate the water in the water reservoir 225. A filter 227 removes impurities from the water. The electrical compartment 216 contains the electrical operating circuitry which includes a timer 223 set by the user to activate the watering pump 226 which pumps water up the central support column to the upper cover section 250. The upper cover section 250 distributes water into the plant station feed chambers 64 or into the trough 163. From the plant station feed chambers 64 or from the trough 163, the water drips through the plurality of water feed lines 266 to the individual plant pots 290 located at each of the plant stations 270. Any excess water draining from the plant pot 290 is returned to the water reservoir 225 by means of a water return line 268.

The operator can set the length and frequency of the activation of the watering pump 226 to control the amount of water being sent to the upper cover section 250 and from there to the plant station 270. A manual switch or a separate timer (not shown) can also be used to control the use of the lighting system for the plants.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

I claim:

1. A vertical plant stand assembly comprising:
   a) a lower base section including an electrical compartment and a water reservoir compartment;
   b) a central vertical support column extending upwardly from the lower base section to a top, the central vertical support column including at least one mounting track attached thereto and at least one plant station mounted to the mounting track;
   c) an upper cover section attached to the top of the central vertical support column, the upper cover section including a water distribution system;
   d) the water reservoir compartment including a water reservoir and a watering pump;
   e) a main water line extending from the water reservoir to the water distribution system; and
   f) a water feed line extending from the water distribution system to the at least one plant station.

2. The vertical plant stand assembly of claim 1 in which the electrical compartment includes a power supply for the watering pump and a timer for selectively activating the watering pump.

3. The vertical plant stand assembly of claim 1 in which the central vertical support column includes a plurality of mounting tracks disposed on various sides of the support column and a plurality of plant stations mounted to the various mounting tracks.

4. The vertical plant stand assembly of claim 1 in which the central vertical support column has a hollow interior and the main water line and the water feed line are hidden in the interior of the central vertical support column.

5. The vertical plant stand assembly of claim 1 in which the water reservoir further includes a circulating pump and a filter for circulating and cleaning water in the water reservoir.

6. The vertical plant stand assembly of claim 1 in which the water distribution system includes:
   a) a water distribution housing attached to an end of the main water line;
   b) at least one nozzle attached by a tubing to the water distribution housing;
   c) at least one plant station feed chamber associated with the nozzle to receive water from the water distribution housing;
   d) the water feed line attached to the plant station feed chamber so that water from the water distribution system can be fed to the plant station.

7. The vertical plant stand assembly of claim 6 in which a plurality of plant stations are mounted on the central vertical support column and a plurality of nozzles are connected by tubings to the water distribution housing, each nozzle being connected to a separate plant station by a separate water feed line connected to the nozzle so that water from the water distribution system can be fed to each of the plant stations.

8. The vertical plant stand assembly of claim 1 in which the upper cover section also includes a light fixture so that the plant station can be illuminated.

9. The vertical plant stand assembly of claim 1 in which the plant station includes a mounting arm with at least one bracket thereon for attaching the plant station to the mounting track.

10. The vertical plant stand assembly of claim 9 in which the mounting arm has a water feed line inlet for guiding the water feed line from the water distribution system to the plant station.

11. The vertical plant stand assembly of claim 10 in which the plant station includes a generally rectangular box and a plant pot mounted on a hollow base plate inside the box, the hollow base plate including a stem attached thereto and a water return line extending from the hollow base plate to the water reservoir.

12. The vertical plant stand assembly of claim 11 in which the mounting arm has a water return line outlet for guiding the water return line from the plant station to the water reservoir.

13. The vertical plant stand assembly of claim 1 in which the plant station comprises:
   a) a hollow base plate,
   b) a plant pot mounted on the base plate,
   c) at least one access tube extending from the base plate and communicating with the hollow interior thereof, and
   d) at least one wick extending from the hollow interior of the base plate through an access tube and into the plant pot.

14. The vertical plant stand assembly of claim 13 in which a plurality of access tubes extend from the base plate of the plant station and a water level indicator is disposed in one of the access tubes.

15. The vertical plant stand assembly of claim 1 in which the plant station includes a second wick extending from the hollow interior of the base plate and into the bottom of the plant pot.

* * * * *